July 30, 1935.   L. R. WILLIAMSON   2,009,983
BRAKE ADJUSTING DEVICE
Filed Sept. 30, 1932
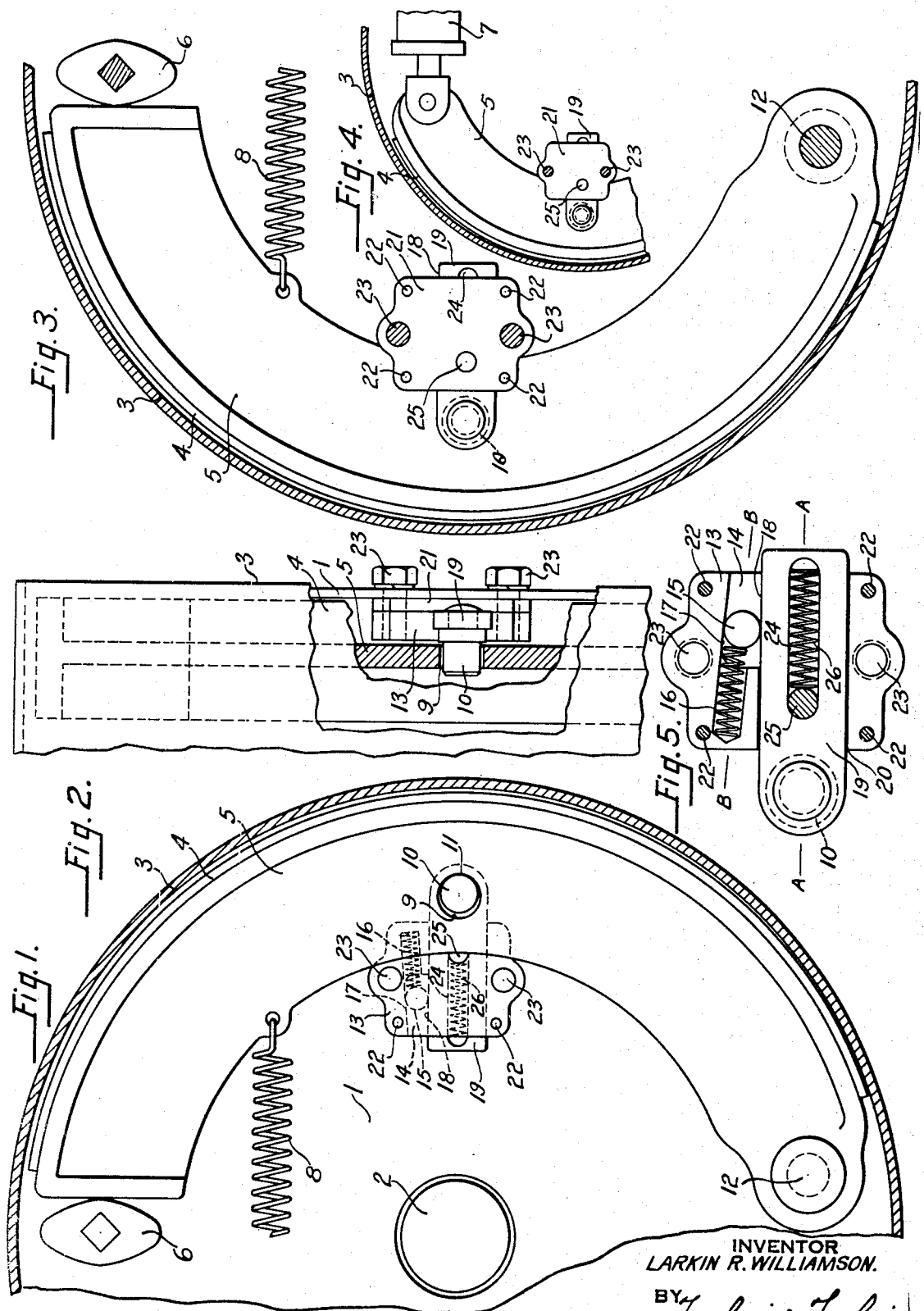
INVENTOR
LARKIN R. WILLIAMSON.
BY
ATTORNEY Patented July 30, 1935

2,009,983

UNITED STATES PATENT OFFICE 2,009,983

BRAKE ADJUSTING DEVICE

Larkin R. Williamson, Cincinnati, Ohio, assignor to Cornelius J. Hauck, Cincinnati, Ohio Application September 30, 1932, Serial No. 635,594

3 Claims. (Cl. 188—79.5)

My invention relates to brakes and in particular to self-adjusting means for brakes.

It is my object to provide means for automatically adjusting the position of the brake shoe and brake drum in exact proportion to the amount of wear after each braking operation so that the next actuation of the brake will be upon the same relative position and bring about the same relative braking action that the first braking action brought about.

In the present state of the art, after the braking surfaces wear an appreciable period, it is then necessary to readjust the brakes; according to my invention this adjustment takes place automatically by a resetting of the position of the brake shoe or the brake disc surface, or both, between each braking operation without the necessity of any mechanical adjustment on the part of the operator.

Referring to the drawing, Figure 1 is a front elevation of a portion of the brake shoe showing the brake drum in section.

Figure 2 is an end elevation with the brake drum and brake shoe partially broken away.

Figure 3 is a section through the brake drum showing the inside of the brake shoe with the self-adjusting mechanism attached.

Figure 4 is an alternate view similar to Figure 3 showing the use of an actuating cylinder in place of the cam actuator shown in Figures 1 and 3.

Figure 5 is a detail view partially in section with the cover removed of the self-adjusting mechanism.

Referring to the drawing in detail, 1 is a brake housing mounted on the axle 2 having therein a brake drum surface or braking surface 3 which is engaged by the brake shoe liner 4 on the brake shoe 5. This liner may be either on the inside of the brake drum disc or carried upon the shoe. It is the wearing of this liner that necessitates the adjustment of the shoe with respect to the brake drum surface. Likewise, it is the wearing of the surface of the brake drum that necessitates an adjustment. The brake shoe is actuated into braking position by either the cam actuator 6 or the hydraulic piston 7. The exact form of actuating mechanism forms no part of this invention. This actuation is resisted by the spring 8, which serves to return the brake shoe to its initial position.

The brake shoe 5 is provided with an aperture 9 which is larger than the pin 10 for the purpose hereinafter described. This clearance is equal to the normal clearance between the brake shoe and brake drum in inoperative position, which normal clearance it is desired to maintain as a standard normal clearance. The pin 10 normally engages the outer wall of the hole 9 as at 11. The brake shoe is pivoted in the usual manner at 12.

The brake adjusting mechanism which is the subject of this invention comprises a plate 13 having a diagonally disposed slot 14 which is arranged at an angle of 5° to the axis AA, that is, the line BB is arranged at an angle of 5° to the line AA. This cam slot 14 contains a cam locking roller 15 impelled into working position by the spring 16 and engaging on one side the wall 17 of the slot 14 and on the other side the wall 18 of a stop member 19. This stop member is guided in the slot 20 formed in the lower casing 13 beneath the upper casing 21. These casings are connected together by bolts or rivets 22. These casings are mounted upon the brake housing 1 by the retaining members 23. The stop member 19 is provided with a slot 24 in which projects a pin 25 carried by the casing members 13 and 21 and to engage the member 19 in one end of the slot 24. Between this pin 25 and the other end of the slot 24 is a helical spring 26 tending to keep the stop member 19 in its outermost position with its pin 10 that it carries against the surface 11 of the aperture 9.

As the brake shoe is applied to the brake drum, the pin 10 will be caused to follow the brake shoe and after each reciprocation, maintain its position in engagement with the surface 11 in the hole 9.

In the event of any wear between the brake shoe, its lining and the brake drum, the brake shoe will be automatically set up to predetermine the amount of wear by the engagement of the clutch roller 15 between the surface 17 and surface 18. According to this operation, each new actuation of the brake shoe is from a point closer to the brake drum than the exact amount of the wear caused on the brake shoe, its lining and the brake drum by the previous operation, as by that amount the shoe has been allowed to take a new position with respect to the brake drum. The pin 10 prevents the return through the stop member 19 and the clutch roller 15 engages the surfaces 17 and 18 of the brake shoe to its initial position and only permits it to return to a position nearer to the brake shoe in the amount of wear that has taken place during the preceding braking operation.

My invention, therefore, consists in a braking surface and the brake shoe, with one half of the clutch member carried by the brake housing and the other half by the brake shoe, the clutch being so arranged that the brake shoe will return to a new position as much removed from the old initial position as the amount of wear that has taken place.

It will be understood that I desire to comprehend within my invention such modifications as may be necessary to adapt it to varying conditions and uses.

It will be understood that any form of clutch means may be employed in addition to a roller, such as a wedge or any other equivalent mechanism. I do not desire to be confined to mechanical details, as varying types of brake mechanisms on different types of vehicles and machines will require different types of mechanical forms to carry out my invention. By drum I mean any braking surface.

Having thus fully described my invention, what I claim as new and desire to secure by Letters Patent, is:

1. In a brake, a brake shoe, a braking support, a housing carried by said braking support having a major slot and a slot diagonally disposed with respect to the major slot, a stop member in said major slot, a brake shoe limiting pin on said stop member, a clutch roller in said diagonal slot engaging one wall thereof and one wall of the stop member, said brake shoe having an aperture of larger size than said limiting pin for receiving the limiting pin on said stop member, a guide pin in said housing arranged in a slot in said stop member, and yielding means between said stop member and said guide pin, and yielding means for forcing said clutch roller into clutch engaging position.

2. A new article for use as a brake adjusting mechanism comprising a housing having a main slot and a diagonal slot arranged at an angle of 5 degrees with respect to said main slot, a stop member in said main slot adapted to be moved by a brake shoe, yielding means for resisting said movement of the stop member in the slot, a clutch means engaging said stop member located in said diagonal slot and yielding means for moving said clutch means into clutching position.

3. A new article for use as a brake adjusting mechanism comprising a housing having a main slot and a diagonal slot arranged at an angle of 5 degrees with respect to said main slot, a stop member in said main slot adapted to be moved by a brake shoe, yielding means for resisting said movement of the stop member in the slot, a clutch means engaging said stop member located in said diagonal slot and yielding means for moving said clutch means into clutching position, said stop member having a loose connecting means with said brake shoe to cause the movement of the stop member with the brake shoe when excessive movement of the brake shoe takes place due to wear, said clutch means permitting free forward movement of said stop member.

LARKIN R. WILLIAMSON.